United States Patent
Cai et al.

(10) Patent No.: US 9,002,121 B2
(45) Date of Patent: Apr. 7, 2015

(54) METHOD AND APPARATUS FOR ENCODING GEOMETRY PATTERNS, AND METHOD FOR APPARATUS FOR DECODING GEOMETRY PATTERNS

(75) Inventors: Kangying Cai, Beijing (CN); Jiheng Yang, Beijing (CN); Jun Teng, Beijing (CN); Zhijin Xia, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 121 days.

(21) Appl. No.: 13/825,546

(22) PCT Filed: Sep. 30, 2010

(86) PCT No.: PCT/CN2010/001540
§ 371 (c)(1),
(2), (4) Date: Mar. 21, 2013

(87) PCT Pub. No.: WO2012/040883
PCT Pub. Date: Apr. 5, 2012

(65) Prior Publication Data
US 2013/0182960 A1    Jul. 18, 2013

(51) Int. Cl.
*G06K 9/36*    (2006.01)
*G06K 9/34*    (2006.01)
(Continued)

(52) U.S. Cl.
CPC ............. *G06T 17/10* (2013.01); *G06T 15/04* (2013.01); *G06T 17/00* (2013.01); *G06T 9/001* (2013.01)

(58) Field of Classification Search
CPC ................................................ G06T 17/30
See application file for complete search history.

(56) References Cited

U.S. PATENT DOCUMENTS

| 5,903,458 A * | 5/1999 | Stewart et al. ........... 700/98 |
| 6,342,884 B1 | 1/2002 | Kamen et al. |

(Continued)

FOREIGN PATENT DOCUMENTS

| CN | 1339142 | 3/2002 |
| JP | 2003528360 | 8/2000 |

(Continued)

OTHER PUBLICATIONS

Cai et al., "Compression of massive models by efficiently exploiting repeated patterns". VRST 2009: 229-230.

(Continued)

*Primary Examiner* — Bhavesh Mehta
*Assistant Examiner* — David F Dunphy
(74) *Attorney, Agent, or Firm* — Robert D. Shedd; Paul P. Kiel; Xiaoan Lu (57) ABSTRACT

3D models often have a large number of small to medium sized connected components, with small numbers of large triangles, often with arbitrary connectivity. The efficiency of compact representation of large multi-component 3D models can be improved by detecting and representing similarities between components thereof, even if the components are not exactly equal. The invention uses displacement maps for encoding two or more different but similar geometry patterns differentially, based on clustering and a cluster representative surface. A method for encoding a plurality of geometry patterns comprises detecting and encoding identical copies of geometrical patterns, detecting and clustering similar geometry patterns, and detecting partial similarity. The detecting partial similarity comprises generating a cluster representative surface, generating for at least one clustered geometry pattern a displacement map, and encoding the common surface and the displacement maps.

28 Claims, 6 Drawing Sheets

(51) Int. Cl.
*G06K 9/62* (2006.01)
*G06T 17/00* (2006.01)
*G06T 9/00* (2006.01)
*G06T 17/10* (2006.01)
*G06T 15/04* (2011.01)

(56) References Cited

U.S. PATENT DOCUMENTS

2008/0036765 A1* 2/2008 Hariya et al. ............... 345/423
2011/0037763 A1   2/2011 Lee

FOREIGN PATENT DOCUMENTS

| JP | 2002517851 | 6/2002 |
| JP | 2004535028 | 1/2003 |
| JP | 2005518032 | 8/2003 |
| KR | 20090025672 | 3/2009 |
| WO | WO9964944 | 12/1999 |
| WO | WO0046754 | 8/2000 |
| WO | WO03007246 | 1/2003 |
| WO | WO03069543 | 8/2003 |
| WO | WO 2009/128660 * | 10/2009 ............. G06T 17/20 |
| WO | WO2009128660 | 10/2009 |
| WO | WO2009140261 | 11/2009 |

OTHER PUBLICATIONS

Cai et al., "Exploiting repeated patterns for efficient compression of massive models", VRCAI 2009: 145-150.
Deering M., "Geometry compression", ACM SIGGRAPH, 1995, pp. 13Œ 20.
Peng et al., "Technologies for 3D mesh compression : A survey", Elsevier Journal of Visual Communication and Image Representation, 16(6), 688-733, 2005.
Shikare et al., "Compression of Large 3D Engineering Models using Automatic Discovery of Repeating Geometric Features", 6th International Fall Workshop on Vision, Modeling and Visualization (VMV2001), Nov. 21-23, 2001, Stuttgart, Germany.
VRML97 The Virtual Reality Modeling Language (VRML). ISO/IEC 14772-1, 1997.
Pattern-based skin deformation of humanmodel, Information and Media Technologies Study Report, Japan,Information and Media Technologies Association, Feb. 18, 2008, vol. 2008, No. 14, pp. 17-22.

* cited by examiner

Prior art

METHOD AND APPARATUS FOR ENCODING GEOMETRY PATTERNS, AND METHOD FOR APPARATUS FOR DECODING GEOMETRY PATTERNS

This application claims the benefit, under 35 U.S.C. §365 of International Application PCT/CN2010/001540, filed Sep. 30, 2010, which was published in accordance with PCT Article 21(2) on Apr. 5, 2012 in English.

FIELD OF THE INVENTION

This invention relates to the efficient encoding of similar geometry patterns, such as components of a multi-component 3D mesh model.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

3D models most widely used in various applications are those with a large number of small to medium sized connected components, each having up to a few hundred polygons on an average. This kind of models is called multi-connected or multi-component 3D models. They play an import role in fields as diverse as biology, physics, engineering and art. This kind of model can be used e.g. for mechanical CAD designs, architectural designs and chemical plants which are increasingly deployed in various virtual world applications.

Figure 1:
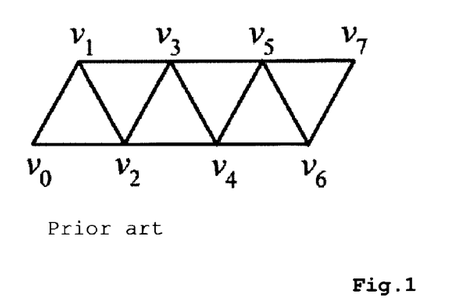

Compact representation is one of the key issues for compact storage and efficient transmission. 3D models are usually represented by "indexed face set" that consists of a coordinate array and a face array. The coordinate array lists the coordinates of all vertices, and the face array lists each face by indexing its three vertices in the coordinate array. There is no compression involved in indexed face set. "Triangle strip"[1] is a widely used compact representation of 3D models that is well supported by most graphic cards. The triangle strip method attempts to divide a 3D mesh into long strips of triangles, as shown in FIG. 1, and then encodes these strips. In FIG. 1, vertices $v_0, \ldots, v_7$ define a strip of triangles, which are part of a 3D mesh model.

Most known 3D compression algorithms propose their own compact representation of 3D models to increase compression ratio. These compact representations work best for smooth surfaces with dense meshes of small triangles. However, large multi-connected 3D models have a large number of connected components, with small numbers of large triangles, often with arbitrary connectivity. The architectural and mechanical CAD models typically have many non-smooth surfaces making these methods less suitable. Moreover, most of the known approaches deal with each connected component separately. Thus, such representations of 3D models do not perform well on large multi-component 3D models.

Recently, some compact representations specially designed for large multi-component 3D models have been proposed. [CAI09VRST][2] and [CAI09VRCAI][3] proposed a compact representation method for large multi-component 3D models, and can detect repeating instances regardless of rotation, translation and/or scaling. Further, displacement maps have been described e.g. in [SKU2008][4] for defining surface details of 3D mesh models. Such details are called mesostructures (as opposed to macrostructures, which define the shape of objects), and include high frequency geometric details that provide textures or light effects. Thus, they are relatively small but still visible, such as bumps on a surface.

SUMMARY OF THE INVENTION

The inventors have recognized that the above-mentioned compact representation methods, which benefit from detecting repeating patterns, can only detect such repeating patterns that are exactly equal under the predefined transformation types, i.e. rotation, translation and scaling. In practical applications, only few 3D models contain such components.

The present invention is based on the recognition of the fact that the efficiency of a compact representation of large multi-component 3D models can be greatly improved by detecting and representing similarities between components thereof, where the components are not exactly equal. In general, such components are geometry patterns.

A novel aspect of the invention is the usage of displacement maps for differentially encoding two or more different but similar geometry patterns, based on a single base model.

According to one aspect of the invention, a method for encoding a plurality of geometry patterns has the steps of detecting and clustering similar geometry patterns, generating a cluster representative surface (e.g. by averaging all clustered geometry patterns), generating for at least one clustered geometry pattern a displacement map, and encoding the common surface and the displacement maps. The similarity of the geometry patterns may be determined after a normalization step.

According to one aspect of the invention, a method for encoding a plurality of geometry patterns (that may be connected components of one or more 3D mesh models) comprises steps of detecting similar geometry patterns, clustering the detected similar geometry patterns in a common cluster, generating a cluster representative surface for the common cluster, generating for at least two geometry patterns that are clustered in said cluster individual displacement maps, wherein each displacement map defines a displacement between vertices of the cluster representative surface and vertices of a clustered geometry pattern, and encoding the plurality of geometry patterns by encoding the cluster representative surface and encoding the displacement maps. The encoding of the displacement maps may also comprise scaling, position, orientation and/or copy information.

According to another aspect of the invention, a method for decoding a plurality of geometry patterns (that may but need not be connected components of one or more 3D mesh models) comprises steps of decoding first data to obtain a cluster representative surface, decoding second and third data to obtain at least two displacement maps, reconstructing the cluster representative surface, reconstructing a first geometry pattern by applying a first displacement map of the at least two displacement maps to the cluster representative surface, and reconstructing a second geometry pattern by applying a second displacement map of the at least two displacement maps to the cluster representative surface. The method may also comprise decoding fourth data that comprises scaling, position, orientation and/or copy information that relates to individual geometry patterns. The fourth data may be e.g. associated with, or extracted from, the second and/or third data.

According to a further aspect of the invention, a device for encoding a plurality of geometry patterns (that may but need not be connected components of one or more 3D mesh models) comprises detection means for detecting similar geometry patterns, clustering means for clustering the detected similar geometry patterns in a common cluster, calculation means for generating a cluster representative surface, displacement map generation means for generating for at least two clustered geometry patterns individual displacement maps, wherein each displacement map defines a displacement between vertices of the cluster representative surface and vertices of a clustered geometry pattern, and an encoder for encoding the plurality of geometry patterns via the cluster representative surface and the displacement maps.

According to yet another aspect of the invention, a device for decoding a plurality of geometry patterns (that may but need not be connected components of one or more 3D mesh models) comprises a first decoder for decoding first data to obtain a cluster representative surface, a second decoder for decoding second data and third data to obtain at least two displacement maps, first reconstructing means for reconstructing the cluster representative surface, second reconstructing means for reconstructing a first geometry pattern by applying a first displacement map of the at least two displacement maps to the cluster representative surface, and third reconstructing means for reconstructing a second geometry pattern by applying a second displacement map of the at least two displacement maps to the cluster representative surface.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in FIG. 1 the concept of triangle strips for 3D mesh model encoding.

DETAILED DESCRIPTION OF THE INVENTION

Figure 2:
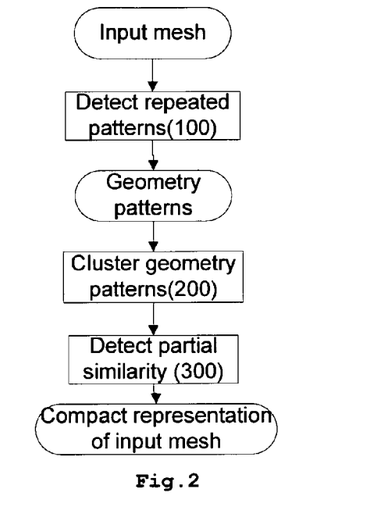
FIG. 2 a flow-chart of the encoding method according to one embodiment.

FIG. 2 shows in an exemplary flow-chart the processing of 3D mesh models. An input mesh is separated 100 into a plurality of geometry patterns. The separating comprises normalization of the geometry patterns in terms of size, position and orientation. The normalization data (size factor, position and orientation data) can be associated with each geometry pattern, or stored in a list, or similar. They will later be used for reconstruction of the original mesh model. In an optional step, repeated geometry patterns are detected. That is, this optional step detects geometry patterns that are exactly equal (within the limits given by the models spatial resolution, quantization or similar). Such geometry patterns are called a "copy set" herein, since they are a set of equal copies. The detected equal patterns are represented by a single representative pattern, which is called herein "copy set representative".

The other geometry patterns, together with the copy set representatives, are then clustered 200 according to their similarity: similar patterns are assigned to a common cluster. In the clustering step 200, the geometry patterns are compared with each other, similar patterns are identified and assigned to their cluster. In one embodiment, a shape descriptor is calculated for each geometry pattern, the shape descriptors are compared with each other, and the clustering is based on the result of the comparison of the shape descriptors. More details are given below. In one embodiment, each portion of the input mesh is assigned to one geometry pattern cluster at the end of the clustering step 200. In another embodiment, one or more portions of the input mesh are not assigned to a cluster, since no geometry pattern that represents similar portions have been detected, or the similarity of detected geometry patterns is not good enough. This may be the case e.g. when the below-described relative encoding requires more bits than conventional encoding. Generally, the below-described encoding is the more effective, the more geometric patterns there are per cluster, and the more similar the geometric patterns of a cluster are.

In the "partial similarity detection" step 300, a common representative for the elements of the cluster is generated. It is referred to as "cluster representative surface" (CRS) or as "initial common surface", since it is a surface that is used for representing all the cluster elements. Generally, the cluster representative surface is a geometric pattern that is as similar as possible to all geometry patterns that are assigned to the cluster. Different methods can be used for obtaining the CRS. In one embodiment, it is obtained by averaging all the geometric patterns assigned to the cluster. In another embodiment, it is obtained by embedding all the geometry patterns of the cluster in a regular grid, and extracting the outer visible surface of the voxel hull. A voxel is a volumetric pixel, i.e. a volume element that represents a value on a regular grid in 3D space. The voxel hull of the pattern cluster is defined as the set of all grid voxels that are inside all the pattern models of the cluster. In one embodiment, the averaged geometric patterns or voxel hull is further optimized by an (analytic or numeric) optimization function.

Figure 3:
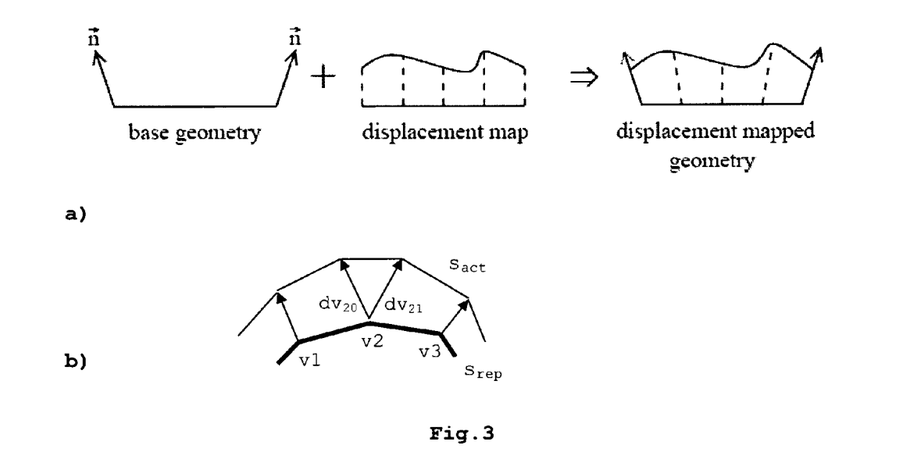
FIG. 3 the principle of displacement mapping.

Since (all or almost all) the individual geometry patterns assigned to a cluster are different from the CRS, this difference is determined by comparing each individual geometry pattern with its CRS, as described below in more detail. Then, the difference is encoded for each geometry pattern separately by means of a displacement map. FIG. 3a shows the general usage of displacement maps. While displacement maps are conventionally used for generating small, hardly visible surface effects, e.g. for surface textures, light and shading effects etc., the present invention uses displacement maps for differential encoding of geometry patterns, i.e. representing the differences between an actual geometry pattern and a CRS. This has the advantage that two or more similar geometry patterns can share a CRS. Since the displacement map requires far less bits for encoding than a complete geometry pattern, a great amount of data reduction (i.e. redundancy reduction) can be achieved. The more geometry patterns are determined to be similar and assigned to a common cluster, the more efficient is the encoding.

In one embodiment, the displacement map defines spatial displacement for the vertices of the CRS. The spatial displacement is a translation operation in space. In one embodiment, the direction of the translation can be individually defined for each vertex. In one embodiment, the direction of the translation is defined to be the direction of the normal of the vertex, which is often known for 3D mesh models. That is, the displacement map of a geometry pattern defines the amount by which each vertex of the cluster representative surface has to be moved in direction of the respective vertex normal, in order to match the vertex of the actual geometry pattern. In one embodiment, the CRS can have more vertices than an actual geometry pattern, and the displacement map can make one or more vertices of the CRS be skipped, e.g. by assigning the value zero to them. In one embodiment, the CRS can have fewer vertices than an actual geometry pattern, and the displacement map can use one or more vertices of the CRS twice (or more often). In one embodiment, the displacement map may also define different directions of displacement. The displacement map may be implemented simply as a sequence of numbers, where each number represents the displacement of a vertex, e.g. when vertices are explicitly or implicitly numbered, as in the stripe show in FIG. 1. Additional sections may be included in the list for position, scale and orientation data, and (if applicable) for embodiments where the number of vertices of the CRS is modified. The list may be further compressed using any compression method.

In an example shown in FIG. 3b, a displacement map assigns to a vertex v2 of the CRS $s_{rep}$ two different displacement vectors $dv_{20}, dv_{21}$, thus increasing the number of vertices of the actual geometry pattern $s_{act}$. This may be done for one or more, or even (exceptionally) all, vertices. The two or more displacement vectors $dv_{20}, dv_{21}$ may—but need not— have different directions.

Figure 4:
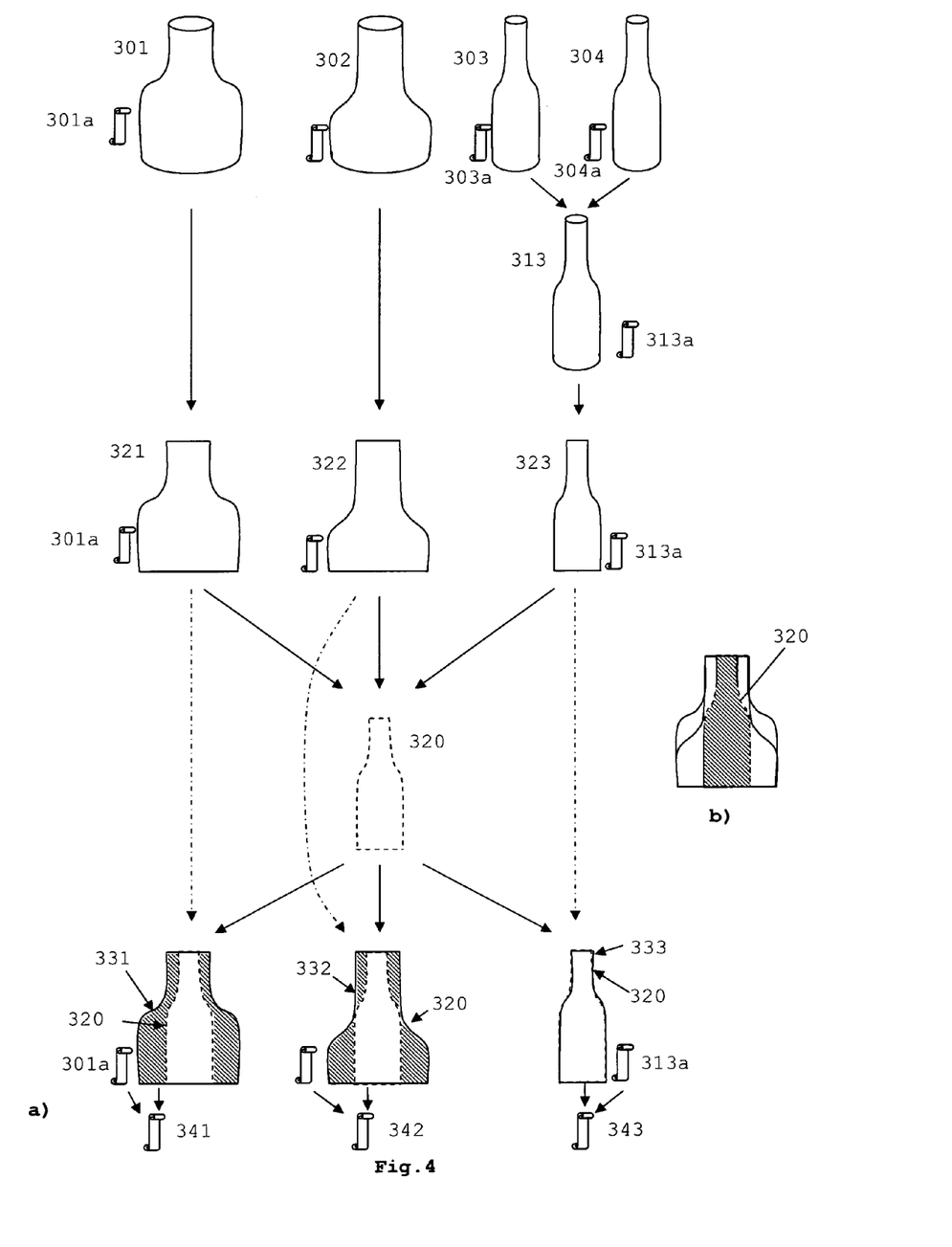
FIG. 4 creation of a cluster representative surface pattern and encoding of members of an exemplary cluster.

FIG. 4 shows an example for encoding. In the example, a 3D mesh model has four individual components 301-304 (that may be simultaneously visible). In FIG. 4 it is assumed that the components 301-304 have already been separated and normalized. The repeating pattern detection block 100 detects that the patterns of two components 303, 304 are exactly equal. They can be represented by a single copy set representative 313, and copy set information (e.g. a list) 313a with details of the components 303,304. A component like 303, 304 may be encoded by a reference to (e.g. identifier of) a copy set representative 313, or its displacement map and CRS respectively, and the individual position, orientation and scale 303a,304a. For simplicity, the components are depicted in profile view 321-323 in FIG. 4. The clustering block 200 determines that the components 321-323 are similar, and the partial similarity detection block 300 generates a CRS 320. E.g. the CRS 320 is the set of voxels that is included in all the geometry patterns 321-323 (after their normalization, as shown in FIG. 4b). In this example, one of the patterns is the copy set representative 313. Information 303a,304a about the individual copies of a copy set may be separate from, or associated with, the data of the copy set representative.

The single components are then represented by their association to a particular cluster (e.g. the cluster ID or CRS ID), and thus the CRS 320 of that cluster, and an individual displacement map 341-343 that defines its individual deviation 331-333 from the CRS. Further, the components may have associated data 301a-304a defining the components scale, position and orientation, and/or further associated data defining individual copies, as exemplarily shown for the copy set representative 313. Then the CRS and the displacement maps are entropy coded. They may be entropy encoded separately or together, using any known entropy coding method.

Figure 5:
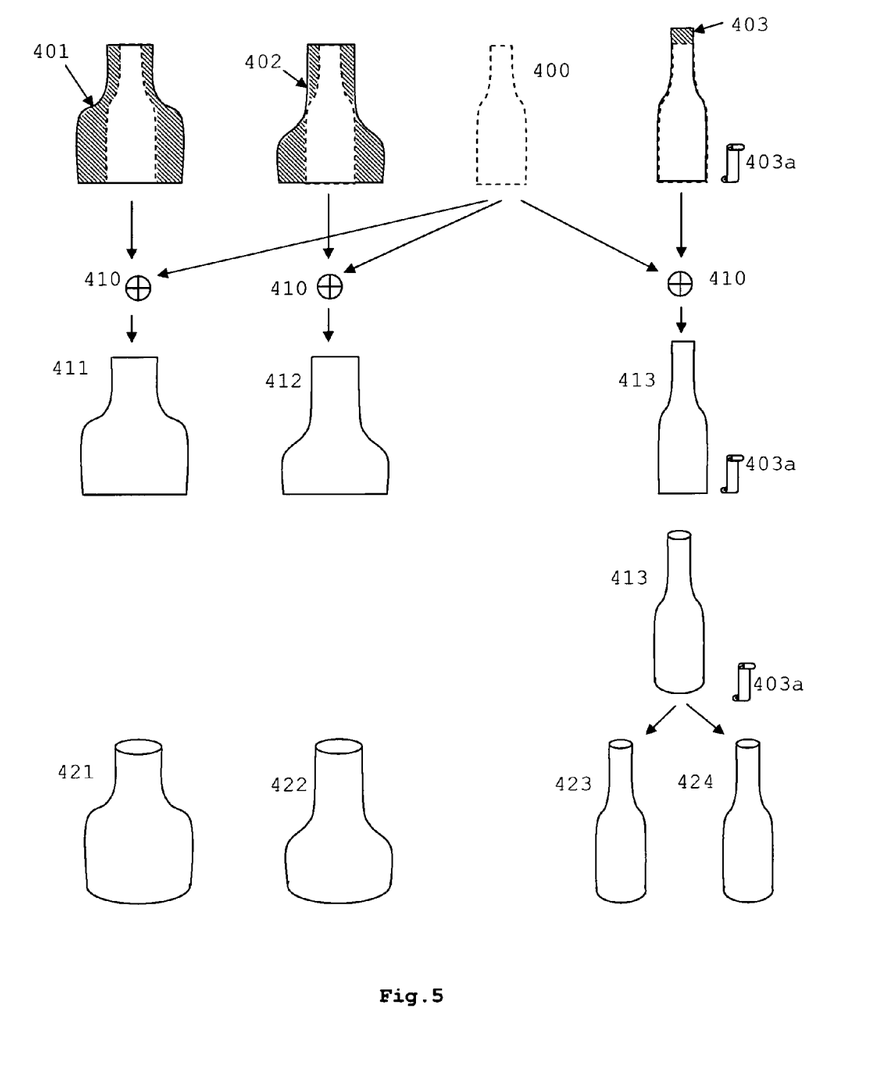
FIG. 5 decoding of members of an exemplary cluster based on a cluster representative surface pattern.
Figure 6:
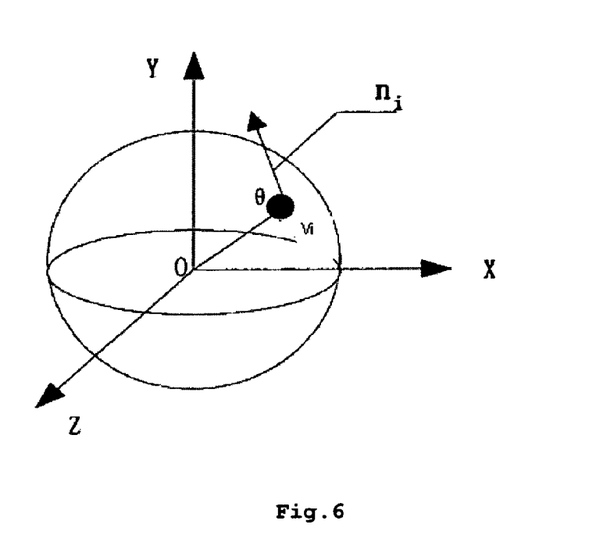
FIG. 6 a vertex, its radius angle and its normal.

FIG. 5 shows exemplarily decoding in one embodiment. A plurality of encoded components, as represented by a CRS 400 and individual displacement maps 401-403 with associated scale, position, orientation and (if applicable) copy data 403a, are entropy decoded. Then the original components 411, 412,413 are reconstructed by applying 410 the displacement maps to the CRS 400. For copy set representatives, such as component 413, each individual copy 423,424 can then be reconstructed by copying the copy set representative according to the copy set information 403a. Finally, the original components are reconstructed by applying the scale, position and orientation information to each individual component. As mentioned above, block 200 clusters the geometry patterns generated by block 100. The clustering is based on the shape descriptor called radius angle, as shown in FIG. 6. A(P), the radius angle of a pattern mesh P, is calculated as follows:

$$A(P) = \frac{\sum_{i} A(v_i)}{\|v_i\|} \quad \text{(Eq. 1)}$$

Figure 7:
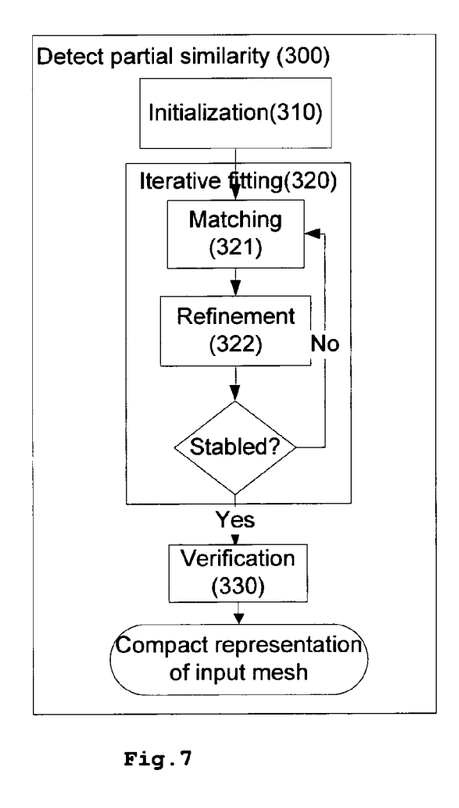
FIG. 7 a flow-chart of a simplified embodiment of the partial similarity detection method.

The radius angle A(P) can be used to classify components into clusters after normalization. Usually, a 3D mesh model will comprise many components that are clustered in several clusters. As also described above, block 300 calculates partial similarities among the geometry patterns that belong to a common pattern cluster. Details of an exemplary embodiment of the block 300 are shown in FIG. 7. It starts by constructing an initial surface that is within all the pattern models of the cluster. The common surface is calculated by an iterative local refinement process. The initialization block 310 calculates the initial common surface by embedding all the geometry patterns in a regular grid. The voxel hull of the pattern cluster is the set of all grid voxels that inside all the pattern models. Subsequently the outer visible surface of the voxel hull is extracted as the initial common surface, or CRS.

The Iterative fitting block 320 iteratively fits the common surface to make it represent pattern models as much as possible. Each iteration consists of two steps, matching in a matching block 321 and deformation in a deformation block 322. The process terminates when the common surface stabilizes, or when a maximum number of iterations is reached.

The Matching block 321 matches each vertex of the common surface to the closest position on each of the pattern models of the current pattern model cluster. Suppose $v_i$ is one vertex of the common surface and $w_{ij}$ is the vertex of pattern model $P_j$ closest to $v_i$. The Refinement block 322 calculates the new common surface by optimizing Eq. 2 (with $v_i$ as parameter), and outputs the CRS. The refinement optimizes the CRS and the displacement.

$$E(v_i^2) = \min_{v_i} \sum_{i} \left( c_1 \sum_{j} \|w_{ij} - v_{ij}\|^2 + \right. \quad \text{(Eq. 2)}$$

$$\left. c_2 \sum_{j} \left\| \left( v_{ij} - \frac{1}{|(ij,kj)|} \sum_{e=(ij,kj)} v_{kj} \right) - l_{ij} \right\|^2 + c_3 \|v_i - v_i'\|^2 \right)$$

$$v_{ij} = v_i + \|w_{ij} - v_i'\| \cdot l_i \ (\cdot = \text{scalar multiplication}) \quad \text{(Eq. 1)}$$

$$l_i = \left( v_i - \frac{1}{|(i,k)|} \sum_{e=(i,k)} v_k \right), l_{ij} = w_{ij} - \frac{1}{|(ij,kj)|} \sum_{e=(ij,kj)} w_{kj} \quad \text{(Eq. 4)}$$

where $v_i$ are the new positions of the common surface vertices, $v_i'$ are the current positions of the common surface vertices and $\|x,y,z\|$ denotes the length of a vector (x,y,z).

Eq. 2 denotes a term that represents an energy function (that corresponds to redundancy in principle). Optimization means minimizing the energy. In Eq. 2, the different terms that are weighted by $c_1$, $c_2$ and $c_3$ represent the following: the first term weighted by $c_1$ stands for the distance between a displaced CRS vertex and the actual vertex, i.e. position matching. The second term weighted by $c_2$ stands for the distance between the normal of the displaced CRS vertex and the normal of the actual vertex, i.e. normal matching. The third term weighted by $c_3$ stands for the iteration step size. In other words, the first term pulls the restored mesh to the original mesh, the second term keeps the local details (normals) of the original mesh, and the third term pulls the common surface to its position fitted in the previous iteration (i.e. compares with previous iteration). $c_1$, $c_2$, and $c_3$ are parameters, e.g. user defined thresholds. For simplification, they can initially be set to $c_1=c_2=c_3=1$, and be modified later according to experience. $l_i$ in Eq. 4 are the so-called Laplacian vectors[5], which can be used to approximate the local normal.

Figure 8:
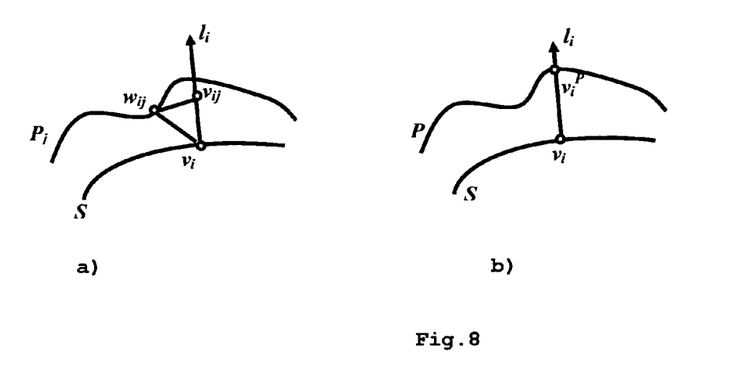
FIG. 8 calculation of an exemplary displacement map.

The Verification block 330 calculates the displacement map of each pattern mesh and verifies whether the common surface and the displacement maps can represent the pattern meshes. For a pattern mesh P, its displacement map is calculated as shown in FIG. 8 where P is a pattern mesh and S is its corresponding common surface. The Laplacian vector can be calculated according to $$l_i = v_i - \frac{1}{|(i,k)|} \sum_{e=(i,k)} v_k \quad \text{(Eq. 5)}$$

The displacement map can be calculated according to $$h_P(v_i) = \|v_i^P - v_i\| \quad \text{(Eq. 6)}$$

The restored pattern mesh is $P'=P+h_p(.)$. If the distance between P' and P is less than some user defined threshold, P can be represented by its corresponding common surface S and displacement map h( ). The distance between P' and P may be the so-called Hausdorff distance. One exemplary method for calculating this distance between two meshes is described by [ASPERT02][6]. The above-mentioned user defined threshold can be adapted to current needs, so that the compression is either lossy or (at least visually) lossless.

In the output compact representation, the common surfaces calculated in Block 300 are also called geometry patterns.

In one embodiment, a compact representation of a multi-connected 3D mesh model includes
  some bits to indicate the number of geometry patterns, wherein the CRS are also regarded as a geometry pattern;
  for each geometry pattern, bits to represent the compressed geometry pattern;
  some bits to indicate the number of instances;
  for each instance, bits to show its position, bits to show its scaling, bits to show its orientation axis, bits to show its geometry pattern identifier, a 1-bit flag to indicate whether a displacement map is necessary, and bits to show its individual displacement map (if it has one).

Figure 9:
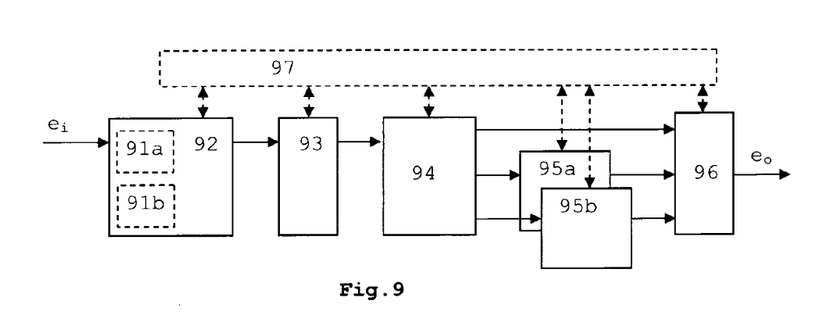
FIG. 9 the principal structure of an exemplary encoder.

FIG. 9 shows an embodiment of a device for encoding a plurality of geometry patterns $e_i$ that may (but need not) be connected components of one or more 3D mesh models. The device comprises detection means 92 for detecting similar geometry patterns, clustering means 93 for clustering the detected similar geometry patterns in a common cluster, calculation means 94 for generating a cluster representative surface, displacement map generation means 95a,95b for generating for at least two clustered geometry patterns individual displacement maps, wherein each displacement map defines a displacement between vertices of the cluster representative surface and vertices of a clustered geometry pattern, and an encoder 96 for encoding the plurality of geometry patterns via the cluster representative surface and the displacement maps. The encoder outputs an encoded data stream $e_o$. The device may comprise one or more displacement map generation means 95a,95b. In one embodiment, the detection means 92 comprises a normalizer 91a (e.g. calculation means) for normalizing detected geometry patterns and for providing position, orientation and scale information regarding the detected geometry patterns. Some or all modules may access a common storage means 97.

In one embodiment, the detection means 92 for detecting similar geometry patterns comprises copy detection means 91b for initially detecting at least two geometry patterns that are equal (after normalization), and for representing them as instances of a copy set representative geometry pattern. In this case, the subsequent modules (clustering means 93, CRS calculation means 94, displacement map generation means 95a,95b and encoder 96) use the copy set representative instead of the individual equal geometry patterns, and the encoder 96 encodes with the at least two concerned geometry patterns a reference to the copy set representative and the individual position, orientation and scale information.

Figure 10:
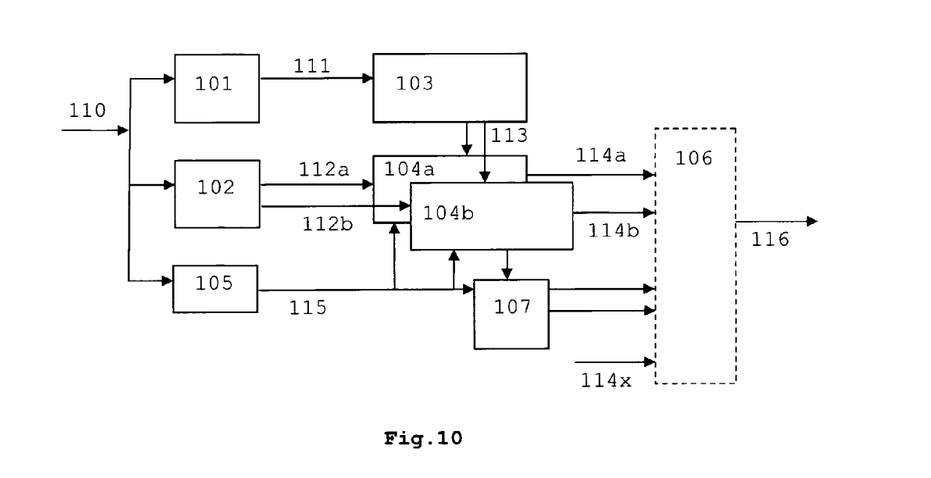
FIG. 10 the principal structure of an exemplary decoder.

FIG. 10 shows an embodiment of a device for decoding from an input data stream 110 a plurality of geometry patterns that may (but need not) be connected components of one or more 3D mesh models. The device comprises a first decoder 101 for decoding first data to obtain a cluster representative surface 111 (i.e. CRS decoder 101), a second decoder 102 for decoding second data to obtain at least two displacement maps 112a,112b, first reconstructing means 103 for reconstructing the cluster representative surface 113 (i.e. CRS reconstructor 103), second reconstructing means 104a for reconstructing a first geometry pattern 114a by applying a first displacement map 112a of the at least two displacement maps to the cluster representative surface (i.e. geometry pattern reconstructor 104a), and third reconstructing means 104b for reconstructing a second geometry pattern 114b by applying a second displacement map 112b of the at least two displacement maps to the cluster representative surface 113. The second and the third reconstructing means 104a,104b may be identical, i.e. a single geometry pattern reconstructing means 104. Alternatively, there may also be more geometry pattern reconstructing means, which is advantageous for simultaneous processing.

In one embodiment, the device for decoding further comprises a third decoder 105 for decoding third data from the input data stream 110 to obtain position, orientation and scale data 115 of the first and/or the second and/or further geometry patterns, which are then used to reconstruct the individual geometry patterns. In one embodiment, a combining means 106 (e.g. renderer) combines at least the first and second reconstructed geometry patterns 114a,114b, and optionally further geometry patterns 114x, to a 3D mesh model 116 that is output.

In one embodiment, the decoder further comprises fourth reconstruction means 107 for reconstructing at least two equal components from a geometry pattern that is a copy set representative (such as component 413), wherein the two equal components have different position, orientation and/or size information associated. Each individual copy 423,424 can then be reconstructed by copying the copy set representative according to the copy set information 403a, or according to individual component information associated with a data set representing a component.

Figure 11:
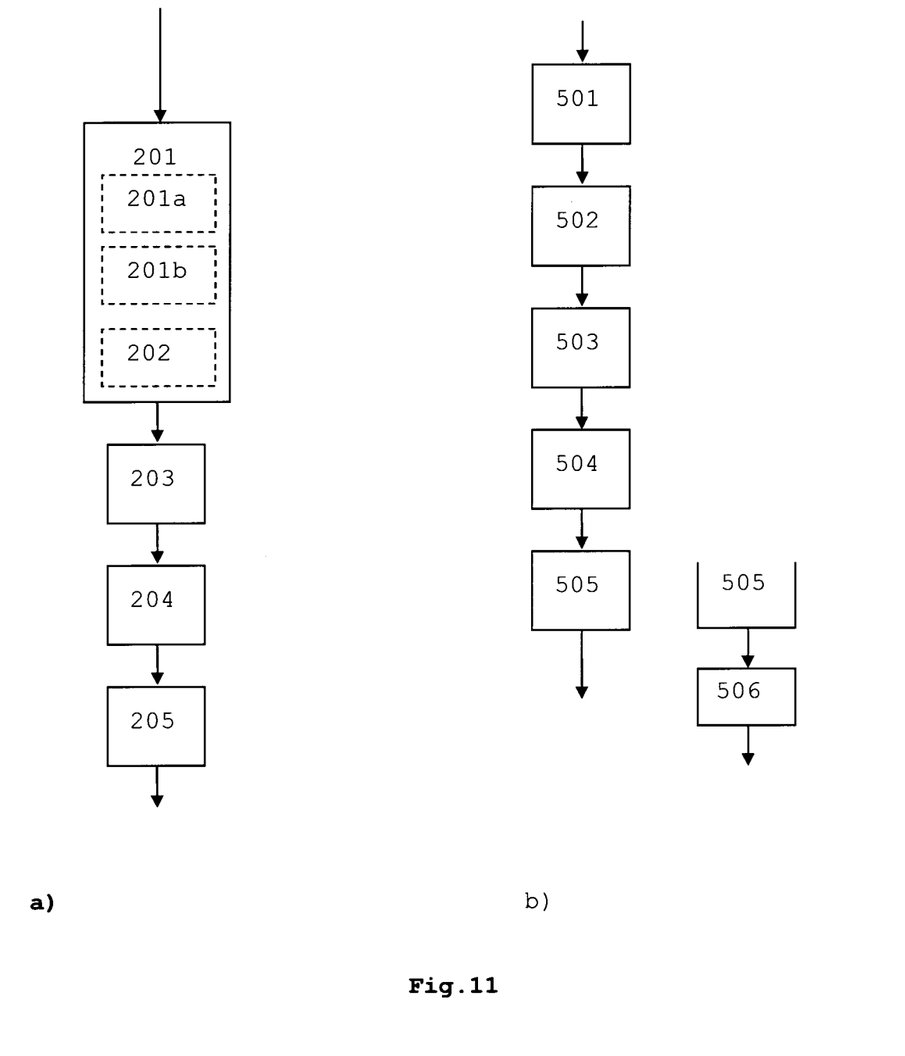
FIG. 11 exemplary flow-charts of the encoding and decoding methods.

In one embodiment, as shown in FIG. 11a), a method for encoding a plurality of geometry patterns, wherein the geometry patterns may (but need not) be connected components of one or more 3D mesh models, comprises steps of detecting 201 similar geometry patterns 301,302,303,304, clustering 203 the detected similar geometry patterns in a common cluster, generating or calculating 204 a CRS 320, generating 205 for at least two clustered geometry patterns individual displacement maps 331,332,333, wherein each displacement map defines a displacement between vertices of the CRS 320 and vertices of a clustered geometry pattern, and encoding the plurality of geometry patterns by encoding the CRS and the displacement maps.

In one embodiment, the step of detecting similar geometry patterns 201 comprises normalizing 201a the connected components, and then comparing 201b the normalized components with each other in order to detect similarities. The normalizing may comprise normalizing the size (i.e. scaling), orientation (i.e. rotation) and/or position (i.e. translation) of the geometry patterns.

In one embodiment, generating or calculating 204 a CRS for a cluster comprises averaging the clustered geometry patterns of the cluster.

In one embodiment, the step of detecting 201 similar geometry patterns comprises an initial step of detecting 202 at least two geometry patterns 303,304 that are equal (in one embodiment, after normalization), and representing them as instances of a geometry pattern representative 313: for the step of clustering 203 and the further steps, the geometry pattern representative 313 is used instead of the individual equal geometry patterns 303,304. In this embodiment, an indication is encoded with the geometry pattern or its displacement map, indicating to which geometry pattern representative 313 it refers. It may also indicate their transformation information, i.e. one or more of their position, orientation and scale. In one embodiment, equal geometry patterns 303, 304 are represented in the encoded data stream by their common representative 320 (or its identifier), a single displacement map and different individual transformation information data sets.

In one embodiment, the step of generating displacement maps 95 for the at least two geometry patterns in the cluster comprises minimizing an energy function (Eq. 2 mentioned above). In one embodiment, the energy function is minimized iteratively. In one embodiment, the energy function comprises at least a first portion representing position matching of vertices, and a second portion representing direction matching of normals. If the energy function is minimized iteratively, the energy function may comprise a third portion representing an iteration step size.

In one embodiment, the displacement map defines a displacement of each vertex of the cluster representative surface 320 in the direction of its respective normal. In one embodiment, the displacement map may additionally define a direction of displacement for a vertex. The direction of displacement may be differentially encoded, e.g. a deviation from the vertex' normal direction.

In one embodiment, calculating 204 the initial common surface comprises iterating: each iteration comprises a step of matching (i.e. matching each vertex of the common surface to the closest position on each of the pattern models of the current pattern model cluster) and a step of deforming (i.e. minimizing position deviation and normal deviation). In one embodiment, Laplacian vectors according to Eq. 5 are used for approximating the normals.

In one embodiment, calculating 204 the CRS comprises embedding all the geometry patterns of a cluster in a regular grid, and extracting the outer visible surface of the voxel hull as an initial common surface. The voxel hull of the pattern cluster is the set of all grid voxels that are inside all the pattern models.

In one embodiment, calculating 204 the CRS initial common surface comprises optimization according to Eq. 2.

In one embodiment, the method comprises steps of storing and/or transmitting the representative surface and the displacement maps of a cluster.

In one embodiment, as shown in FIG. 11b), a method for decoding a plurality of geometry patterns that are connected components of one or more 3D mesh models comprises steps of decoding 501 first data to obtain a cluster representative surface 420, decoding 502 second data to obtain at least two displacement maps, reconstructing 503 the CRS 420, reconstructing 504 a first geometry pattern 421 by applying a first displacement map of the at least two displacement maps to the CRS 420, and reconstructing 505 a second geometry pattern 422 by applying a second displacement map of the at least two displacement maps to the CRS 420.

In one embodiment of the decoding method, it further comprises the step of decoding 506 third data to obtain position, orientation and scale data of the first geometry pattern 421 and/or the second geometry pattern 422.

It should be noted that although in the above described exemplary embodiments common representatives for a cluster are a least common subset of voxels, other types of common representative for a cluster may be constructed, as would be apparent to those of ordinary skill in the art, all of which are contemplated within the spirit and scope of the invention.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to rotation symmetric components, one skilled in the art would recognize that the method and devices described herein may be applied to any type of components. Although the plurality of geometry patterns has been described as connected components of one or more 3D mesh models, the plurality of geometry patterns may in principle comprise any group of geometry patterns that are encoded together, particularly if the encoding may take advantage of redundancy among the geometry patterns. It is expressly intended that all combinations of those elements that perform substantially the same function in substantially the same way to achieve the same results are within the scope of the invention. Substitutions of elements from one described embodiment to another are also fully intended and contemplated. Reference signs that—for simplicity—refer to geometry models may be understood as referring to the data that represent these geometry models.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

ANNOTATION

[1] J. L. Peng, C.-S. Kim and C.-C. Jay Kuo. Technologies for 3D mesh compression: A survey. ELSEVIER Journal of Visual Communication and Image Representation, 16(6), 688-733, 2005
[2] Kangying Cai, Yu Jin, Wencheng Wang, Quqing Chen, Zhibo Chen, Jun Teng: Compression of massive models by efficiently exploiting repeated patterns. VRST 2009: 229-230
[3] Kangying Cai, Wencheng Wang, Zhibo Chen, Quqing Chen, Jun Teng: Exploiting repeated patterns for efficient compression of massive models. VRCAI 2009: 145-150
[4] L. Szirmay-Kalos, T. Umenhoffer: "Displacement Mapping on the GPU—State of the Art"; in Computer Graphics Forum (CGF), Volume 25 (2006), Number 3, pp. 1-24
[5] SORKINE, O., LIPMAN, Y., COHEN-OR, D., ALEXA, M., RöSSL, C., AND SEIDEL, H.-P. 2004. Laplacian surface editing. In Proc. of Symp. of Geometry Processing, 179-188.
[6] N. Aspert, D. Santa-Cruz and T. Ebrahimi, MESH: Measuring Error between Surfaces using the Hausdorff distance, in Proceedings of the IEEE International Conference on Multimedia and Expo 2002 (ICME), vol. I, pp. 705-70

The invention claimed is:

1. A method for encoding a plurality of geometry patterns, wherein the geometry patterns are connected components of one or more 3D mesh models, the method comprising:
   detecting similar geometry patterns;
   clustering the detected similar geometry patterns in a common cluster;
   generating a cluster representative surface;
   generating for at least two clustered geometry patterns individual displacement maps, wherein each displacement map defines a displacement between vertices of the cluster representative surface and vertices of a clustered geometry pattern; and
   encoding the plurality of geometry patterns by encoding the representative surface and the displacement maps.

2. The method according to claim 1, wherein said detecting similar geometry patterns comprises normalizing the connected components and then comparing the normalized components, wherein the normalizing refers to position, orientation and size.

3. The method according to claim 2, wherein a displacement map has associated or includes position information, orientation information and/or size information of the respective original component.

4. The method according to claim 1, wherein generating a cluster representative surface for a cluster comprises averaging the clustered geometry patterns of the cluster.

5. The method according to claim 1, wherein said detecting similar geometry patterns comprises an initial step of detecting at least two geometry patterns that are equal after normalization, and representing the at least two geometry patterns as instances of a geometry pattern representative, wherein for the clustering and the further steps the geometry pattern representative is used instead of the individual equal geometry patterns, and wherein an indication is encoded with said at least two geometry patterns indicating to which geometry pattern representative said at least two geometry patterns refer.

6. The method according to claim 1, wherein the displacement map defines a displacement of at least one vertex of the cluster representative surface in the direction of a normal of the cluster representative surface.

7. The method according to claim 1, wherein said generating displacement maps for said at least two geometry patterns in the cluster comprises minimizing an energy function.

8. The method according to claim 7, wherein the energy function is minimized iteratively, and wherein the energy function comprises a first portion representing position matching of vertices, a second portion representing direction matching of normals, and a third portion representing an iteration step size.

9. A method for decoding a plurality of geometry patterns, wherein the geometry patterns are connected components of one or more 3D mesh models, the method comprising:
   decoding first data to obtain a cluster representative surface;
   decoding second data and third data to obtain at least two displacement maps;
   reconstructing the cluster representative surface;
   reconstructing a first geometry pattern by applying a first displacement map of the at least two displacement maps to the cluster representative surface; and
   reconstructing a second geometry pattern by applying a second displacement map of the at least two displacement maps to the cluster representative surface.

10. The method according to claim 9, further comprising decoding fourth data to obtain position, orientation and scale data of the first and/or the second geometry pattern, wherein the fourth data is extracted from said second or third data.

11. The method according to claim 9, further comprising combining at least the first and second reconstructed geometry patterns into a 3D mesh model.

12. A device for encoding a plurality of geometry patterns that are connected components of one or more 3D mesh models, comprising
   a detector configured to detect similar geometry patterns;
   a clustering module configured to cluster the detected similar geometry patterns in a common cluster;
   a calculator configured to generate a cluster representative surface;
   a displacement map generator configured to generate for at least two clustered geometry patterns individual displacement maps, wherein each displacement map defines a displacement between vertices of the cluster representative surface and vertices of a clustered geometry pattern; and
   an encoder configured to encode the plurality of geometry patterns via the cluster representative surface and the displacement maps.

13. The device for encoding according to claim 12, wherein the detector comprises a normalizer configured to normalize the connected components and then compare the normalized components, wherein the normalizing refers to position, orientation and size.

14. A device for decoding a plurality of geometry patterns that are connected components of one or more 3D mesh models, comprising
   a first decoder configured to decode first data to obtain a cluster representative surface;
   a second decoder configured to decode second data to obtain at least two displacement maps;
   a first reconstructing module configured to reconstruct the cluster representative surface;
   a second reconstructing module configured to reconstruct a first geometry pattern by applying a first displacement map of the at least two displacement maps to the cluster representative surface; and
   a third reconstructing module configured to reconstruct second geometry pattern by applying a second displacement map of the at least two displacement maps to the cluster representative surface.

15. The device for decoding according to claim 14, further comprising a combiner configured to combine at least the first and second reconstructed geometry patterns into a 3D mesh model, and a fourth reconstructing module configured to reconstruct at least two equal components from a geometry pattern that is a copy set representative, wherein the two equal components have different position, orientation and/or size information associated.

16. The device for decoding according to claim 14, wherein the second decoder is further configured to decode fourth data to obtain position, orientation and scale data of at least one of the first and the second geometry pattern, wherein the fourth data is extracted from said second data.

17. The device for decoding according to claim 14, further comprising a combiner configured to combine at least the first and second reconstructed geometry patterns into a 3D mesh model.

18. An apparatus for encoding a plurality of geometry patterns, wherein the geometry patterns are connected components of one or more 3D mesh models, the apparatus comprising a processor and a memory having stored thereon computer executable instructions that when executed configure the processor to
 detect similar geometry patterns;
 cluster the detected similar geometry patterns in a common cluster;
 generate a cluster representative surface;
 generate for at least two clustered geometry patterns individual displacement maps, wherein each displacement map defines a displacement between vertices of the cluster representative surface and vertices of a clustered geometry pattern; and
 encode the plurality of geometry patterns by encoding the representative surface and the displacement maps.

19. The apparatus according to claim 18, wherein the processor is configured to normalize the connected components and then to compare the normalized components to detect similar geometry patterns, wherein the normalizing refers to position, orientation and size.

20. The apparatus according to claim 18, wherein a displacement map has associated or includes position information, orientation information and/or size information of the respective original component.

21. The apparatus according to claim 18, wherein the processor is configured to average the clustered geometry patterns of the cluster to generating the cluster representative surface for the cluster.

22. The apparatus according to claim 18, wherein the processor is configured to initially detect at least two geometry patterns that are equal after normalization, to represent the at least two geometry patterns as instances of a geometry pattern representative, and to use the geometry pattern representative instead of the individual equal geometry patterns, and wherein the processor is configured to encode an indication with said at least two geometry patterns indicating to which geometry pattern representative the at least two geometry patterns refer.

23. The apparatus according to claim 18, wherein the displacement map defines a displacement of at least one vertex of the cluster representative surface in the direction of a normal of the cluster representative surface.

24. The apparatus according to claim 18, wherein the processor is configured to minimize an energy function to generate the displacement maps for said at least two geometry patterns in the cluster.

25. The apparatus according to claim 24, wherein the energy function is minimized iteratively, and wherein the energy function comprises a first portion representing position matching of vertices, a second portion representing direction matching of normals, and a third portion representing an iteration step size.

26. An apparatus for decoding a plurality of geometry patterns, wherein the geometry patterns are connected components of one or more 3D mesh models, the apparatus comprising a processor and a memory having stored thereon computer executable instructions that when executed configure the processor to
 decode first data to obtain a cluster representative surface;
 decode second data and third data to obtain at least two displacement maps;
 reconstruct the cluster representative surface;
 reconstruct a first geometry pattern by applying a first displacement map of the at least two displacement maps to the cluster representative surface; and
 reconstruct a second geometry pattern by applying a second displacement map of the at least two displacement maps to the cluster representative surface.

27. The apparatus according to claim 26, wherein the processor is further configured to decode fourth data to obtain position, orientation and scale data of the first and/or the second geometry pattern, wherein the fourth data is extracted from at least one of said second and third data.

28. The apparatus according to claim 26, wherein the processor is further configured to combine at least the first and second reconstructed geometry patterns into a 3D mesh model.

* * * * *